United States Patent [19]

Krikorov et al.

[11] 3,728,436

[45] Apr. 17, 1973

[54] METHOD OF OBTAINING SILICON MONOXIDE

[76] Inventors: Vadim Sergeevich Krikorov, K-482, korpus 347, kv. 30; Vladimir Grigorievich Krasov, K-482, korpus 447, kv. 118; Boris Alexandrovich Sukhodaev, K-482, korpus 349, kv. 9; Vilaly Kazimirovich Kokin, K-482, korpus 320, kv. '36; Valentin Danilovich Zhelninsky, K-482, korpus 328, kv. 112; Nikolai Mefodievich Sukhanov, K-482, korpus 318, kv. 81; Gennady Mikhailovich Leonov, K-482, korpus 405, kv. 113; Nikolai Ivanovich Likholetov, K-482, korpus 321, kv. 159; Igor Tikhonovich Kovalev, K-482, korpus 338-a, kv. 52; Vladimir Vladimirovich Gusev, k-482, korpus 337, kv. 15; Andrei Petrovich Medvedev, K-482, korpus 305, kv. 66, all of Moscow, U.S.S.R.

[22] Filed: Nov. 9, 1970

[21] Appl. No.: 88,153

Related U.S. Application Data

[63] Continuation of Ser. No. 748,904, July 31, 1968, abandoned.

[52] U.S. Cl. ............................... 423/325, 423/344
[51] Int. Cl. ............................................. C01b 33/00
[58] Field of Search ....................... 23/182, 182 V; 423/325, 344

[56] References Cited

UNITED STATES PATENTS

| 875,675 | 12/1907 | Potter | 23/182 |
|---|---|---|---|
| 3,199,954 | 8/1965 | Pultz | 23/182 X |
| 3,087,789 | 4/1963 | Van Antwerp | 23/182 |
| 875,286 | 12/1907 | Potter | 23/182 |
| 3,269,799 | 8/1966 | Gunn, Jr. | 23/182 |
| 3,301,635 | 1/1967 | Bergna et al. | 23/182 |
| 2,807,600 | 9/1957 | Newton et al. | 23/182 X |
| 3,370,921 | 2/1968 | Wagstaff | 23/182 |

FOREIGN PATENTS OR APPLICATIONS

| 40/22050 | 1965 | Japan | 23/182 |
|---|---|---|---|
| 804,991 | 11/1958 | Great Britain | 23/182 |
| 650,156 | 10/1962 | Canada | 23/182 |

OTHER PUBLICATIONS

Jacobson's "Encyclopedia of Chemical Reactions," Vol. 6, 1956, Ed., page 91, Reinhold Pub. Corp., New York.

"Hackh's Chemical Dictionary," Third Ed. Revised, 1944, pages 143; 775, McGraw-Hill Book Co., N.Y.

"The Iron Age," Jan. 29, 1942, pages 34–38; article by C. A. Zapffe & C. E. Sims.

*Primary Examiner*—Edward Stern
*Attorney*—Waters, Roditi, Schwartz & Nissen

[57] ABSTRACT

A method for obtaining silicon monoxide comprising mixing finely divided polycrystalline silicon particles with amorphous silicon dioxide in a molar ratio of polycrystalline silicon particles to the amorphous silicon dioxide of 1,1 – 1.2:1 whereafter the mixture is sintered at a temperature of 1,250° – 1,400° C. in air for 2–2.5 hours, after which the mixture is subjected to a heat treatment wherein after crushing the mixture, it is subjected to a temperature of 1,350° – 1,400° C in vacuo for 1–2 hours. Silicon monoxide is removed from the vacuum chamber and is of high quality for use in electronics, optics, illumination devices and radio equipment.

5 Claims, No Drawings

METHOD OF OBTAINING SILICON MONOXIDE

This Application is a continuation of our earlier Application Ser. No. 748,904 filed July 31, 1968 and now abandoned.

The present invention relates to methods for obtaining silicon monoxide used in the electronics, radio engineering, optical mechanics and illuminating engineering.

A known method for obtaining silicon monoxide by the metallothermal reduction of silicon and silicon dioxide mixture consists of crushing silicon into particles of 3 to 7 mm in size, disintegrating and mixing same with silicon dioxide in a molar ratio of 1.4 : 1, followed by calcination at a temperature of 200° – 400° C and molding in metal molds under the pressure of 4,000 kg/cm$^2$ and with the heat treatment of the molded charge in vacuo at a temperature of 1,350° – 1,450° C. The yield of the end product is 60 percent.

The disadvantage of the known method is the presence of metal impurities in the molded mixture which causes deterioration of the electrophysical properties of dielectric films produced from silicon monoxide.

Another disadvantage of the known method is a great silicon consumption.

An object of the present invention is to eliminate the above-mentioned disadvantages.

In accordance with the above and other objects the problem of the invention seeks to reduce the silicon consumption, as well as to improve the quality of silicon monoxide, by changing the ratio of the raw components and the process conditions.

This is achieved by employing a method of obtaining silicon monoxide by crushing silicon and mixing it with silicon dioxide, followed by the heat treatment in vacuo of the charge obtained, wherein, according to this invention, prior to said heat treatment, the charge of silicon and silicon dioxide with the molar ratio of 1.1 – 1.2 : 1 is sintered in air at a temperature of 1,250° – 1,400° C.

For a better understanding of the invention by those skilled in the art, the following example is now presented. Polycrystalline silicon is crushed in a crusher until particles of 3 – 7 mm in size are produced, then it is disintegrated into particles of 5 to 100 $\mu$ in size and mixed with the amorphous silicon dioxide in a molar ratio of 1.1 – 1.2 : 1 in a blasting counterflow mill for one hour under a pressure of 4 – 5 atm. The charge so produced weighing 500 g is loaded into quartz boats which are put into a chamber furnace.

The charge sintering takes place in the temperature range of 1,250° – 1,400° C in air for 2–2.5 hours to form a sintered mixture after which the mixture is unloaded and crushed into particles 5 to 10 mm in size. The crushed particles are loaded into a vacuum furnace and heat treated at a temperature of 1,350° – 1,400° C in vacuo for 1 – 2 hours, the residual pressure being 1·10$^{-4}$ mm Hg. Silicon monoxide is condensed on cooled walls of the vacuum furnace in conventional manner and the yield is 425 g of silicon monoxide.

The present method is advantageous in that the silicon consumption is reduced by 20 – 30 percent, the amount of impurities in the silicon monoxide is likewise decreased, while the yield of the end product is increased up to 85 percent.

The process efficiency, according to this invention, is increased by 2 – 3 times as compared with the known processes.

We claim:

1. A method of obtaining silicon monoxide comprising mixing crushed silicon with silicon dioxide in a molar ratio of 1.1–1.2:1, to form a charge, sintering the charge in air at a temperature of 1,250°–1,400° C. for 2–2.5 hours to form a sintered mixture, crushing the sintered mixture to form a crushed mixture of particles of 5–10 mm in size, heat treating said crushed mixture in a vacuum chamber, and recovering silicon monoxide from the vacuum chamber.

2. A method as claimed in claim 1 wherein the crushed silicon and silicon dioxide is of a particle size of 5 to 100$\mu$.

3. A method as claimed in claim 1 wherein heat treating is effected at a temperature of 1,350° – 1,400°C.

4. A method as claimed in claim 3 wherein heat treating is effected for 1–2 hours.

5. A process for obtaining silicon monoxide comprising the steps of:
   a. mixing finely divided polycrystalline silicon particles of 5 to 100$\mu$ with amorphous silicon dioxide with the molar ratio of said polycrystalline silicon particles to said amorphous silicon dioxide being 1.1–1.2:1,
   b. counterflow intermixing and blast milling the mixture for a period of one hour at a pressure of 4–5 atmospheres,
   c. loading the mixture into a quartz boat and placing same into a chamber furnace,
   d. sintering the charge at a temperature of 1,250°–1,400° C. in air for 2–2.5 hours, to thereby form a sintered mixture,
   e. crushing the sintered mixture to form particles of 5–10 mm,
   f. heat treating said particles at a temperature of 1,350°–1,400° C. in a vacuum chamber for a period of 1–2 hours at a residual pressure of 1×10$^{-4}$ mm.Hg; and
   g. recovering silicon monoxide from said vacuum chamber.

* * * * *